United States Patent [19]

Boschert

[11] Patent Number: 5,467,739
[45] Date of Patent: Nov. 21, 1995

[54] APPARATUS FOR SIMULATING A TIDE POOL IN AN AQUARIUM

[76] Inventor: Jeff D. Boschert, 16310 Shannon Rd., Los Gatos, Calif. 95032

[21] Appl. No.: 296,322

[22] Filed: Aug. 25, 1994

[51] Int. Cl.$^6$ .................................................. A01K 63/00
[52] U.S. Cl. ...................................................... 119/247
[58] Field of Search .................................. 119/245, 247, 119/249, 250, 251, 257, 269

[56] References Cited

U.S. PATENT DOCUMENTS

| | | | |
|---|---|---|---|
| 3,185,829 | 5/1965 | Rau | 119/247 X |
| 3,735,738 | 5/1973 | Lake | 119/5 |
| 4,136,638 | 1/1979 | Fedor | 119/257 |
| 5,083,528 | 1/1992 | Strong | 119/257 |
| 5,097,795 | 3/1992 | Adey | 119/3 |
| 5,337,701 | 8/1994 | Syers | 119/25 |

FOREIGN PATENT DOCUMENTS

| | | | |
|---|---|---|---|
| 1470267 | 4/1989 | U.S.S.R. | 119/245 |
| 820509 | 9/1959 | United Kingdom | 119/249 |

*Primary Examiner*—Gene Mancene
*Assistant Examiner*—Thomas Price
*Attorney, Agent, or Firm*—Michael A. Glenn

[57] ABSTRACT

A pump transfers water from an aquarium into a top container and an overflow container that are inserted into an aquarium, lowering the water level within the aquarium, and thereby creating the effect of a tide pool at low tide. Water is pumped into the overflow container when the top container is filled, while drainage holes in the overflow container continue to allow some of the water to flow back into the aquarium. As the overflow container fills with water, its increasing weight pulls down a lever connected to a flapper, uncovering a drain in the top container, thereby draining water pumped into the top container through the drain, and completely draining the overflow container, in turn raising the water level in the aquarium, thereby creating the effect of a tide pool at high tide. When the overflow container is completely drained, the lever is raised, closing the drain, and the cycle is repeated. The tide pool device may be incorporated into any aquarium, for example a wall-mountable aquarium, in which one interlocking piece is affixed to the aquarium and another mounted on a vertical surface, such as a wall; or a coffee-table aquarium in which a transparent aquarium cover is kept flush with the aquarium water surface during intervals that simulate a high tide.

11 Claims, 5 Drawing Sheets ated ecosystem that is appropriate for those plants and
APPARATUS FOR SIMULATING A TIDE POOL IN AN AQUARIUM

BACKGROUND OF THE INVENTION

1. Technical Field

The invention relates generally to aquaria. More particularly, the invention relates to a system for creating a tide pool effect, and other effects, in an aquarium.

2. Description of the Prior Art

Aquaria and other devices, such as terraria, ponds, and pools, have been used for centuries to display plant and animal specimens in simulated, but often realistic, ecosystems. Traditionally, such devices maintain a stable and relatively unvarying environment which provides a simulated ecosystem that is appropriate for those plants and animals that are displayed therein. This consistency, while adequate for preserving these specimens, recreates only a limited part of their natural environment and does not support regularly changeable environmental conditions, such as those encountered by the denizens of a tide pool.

A nature-based ecosystem is described in Adey, *Water Purification System and Apparatus*, U.S. Pat. No. 5.097,795 (224 March 1992). Water from an aquarium is diverted to a tray-shaped receptacle that contains an algal turf. Lights above the receptacle promote algal photosynthesis. The algae remove carbon dioxide and pollutants from the aquarium water, replacing them with oxygen. The receptacle accumulates water and, when filled with water, rotates on pivots, releasing the cleansed water back into the tank. The device disclosed in Adey is directed towards the maintenance of suitable water conditions in the aquarium environment, but does not permit any changes or variations in the aquatic ecosystem.

Additionally, traditional aquaria do not always display the specimens to advantage, nor are such aquaria well integrated into the environment in which they are placed, e.g. a living room or den. One such problem generally encountered with aquaria is the effect of light diffraction, which tends to obscure the contents of an aquarium, for example when one is looking through the aquarium cover and the layer of air situated between the aquarium cover and the water surface. Accordingly, an aquarium is usually best viewed through transparent sides that are in direct contact with the water medium, and not through the aquarium top, thus limiting the desirability of placing the aquarium on the floor, for example in a coffee table.

Aquaria are often bulky and heavy, and are therefore usually placed on unsightly metal stands. A design for a wall-mounted aquarium is disclosed in Lake, *Wall Mountable Aquarium*, U.S. Pat. No. 3,735,738 (29 May 1973). An aquarium tank is inserted into and secured to a frame. Externally mounted support structures are used to bear the weight of the tank. A length of wire is threaded through an adhesive that affixes the support structure to the tank. The wire terminates in a loop that is used to hang the aquarium on a wall hook. The wire loop and hook attachment is unstable and unreliable,i.e. it may slip or break, resulting in the breaking and/or emptying of the aquarium. Such occurrence both endangers the aquatic specimens, and creates a likelihood of water damage.

It would be a significant advance in the art to improve the manner in which animal and plant specimens are displayed in simulated ecosystems, such as those provided by aquaria, in particular by reproducing such rhythmic cycles as those of tide pools, while allowing display and location of the aquarium in a manner that shows specimens contained therein to advantage, and that integrates the aquarium gracefully into the environment in which it is placed.

SUMMARY OF THE INVENTION

One aspect of the invention creates a tide pool effect within an aquarium. In the preferred embodiment of the invention, a tide pool device that includes a top container and an overflow container is inserted into an aquarium. A pump transfers water from the aquarium into the top container, lowering the water level within the aquarium, and thereby creating the effect of a tide pool at low tide. When the top container is filled with water, the water flows into the overflow container. A drain in the overflow container continually allow some of this water to flow back into the aquarium. As the overflow container fills with water, its weight increases and it pulls down a lever that is connected to a flapper, thereby opening the drain in the top container. Water pumped into the top container is thereby drained from the container, thereby permitting the overflow container to completely drain, which in turn raises the water level in the aquarium. This creates the effect of a tide pool at high tide. When the overflow container is empty, the lever is raised, closing the drain in the top container, and the cycle repeats.

The tide pool device may be inserted into any aquarium, for example a wall-mounted aquarium. In an exemplary embodiment of the invention, a wall-mounted aquarium is provided that has one interlocking member that is affixed to the aquarium and that is adapted to engage securely with another interlocking member that is mounted on a vertical surface, such as a wall. To mount the aquarium to a wall, the aquarium is first placed to the wall, and then slid downwardly along the wall and into the interlocking member that is affixed to the wall, such that the two interlocking members are brought into abutting engagement with each other.

In another exemplary embodiment of the invention, the tide pool device may be inserted into a coffee table aquarium that is fitted into an opening in the top of the table, such that an aquarium cover is flush with the water surface, for example during a simulated high tide, to create a glass bottom boat effect.

DETAILED DESCRIPTION OF THE INVENTION

The invention described herein provides a device that creates a natural and variable environment within an aquarium that simulates the rhythmic variations of an ecosystem, such as those of a tide pool. The invention therefore provides a device that reproduces within an aquarium the environmental conditions required for preservation and display of the various plant and animal species that are found in tide pool zones. These specimens can therefore be sustained within the aquarium to allow them to be displayed for aesthetic and educational purposes.

Figure 1:
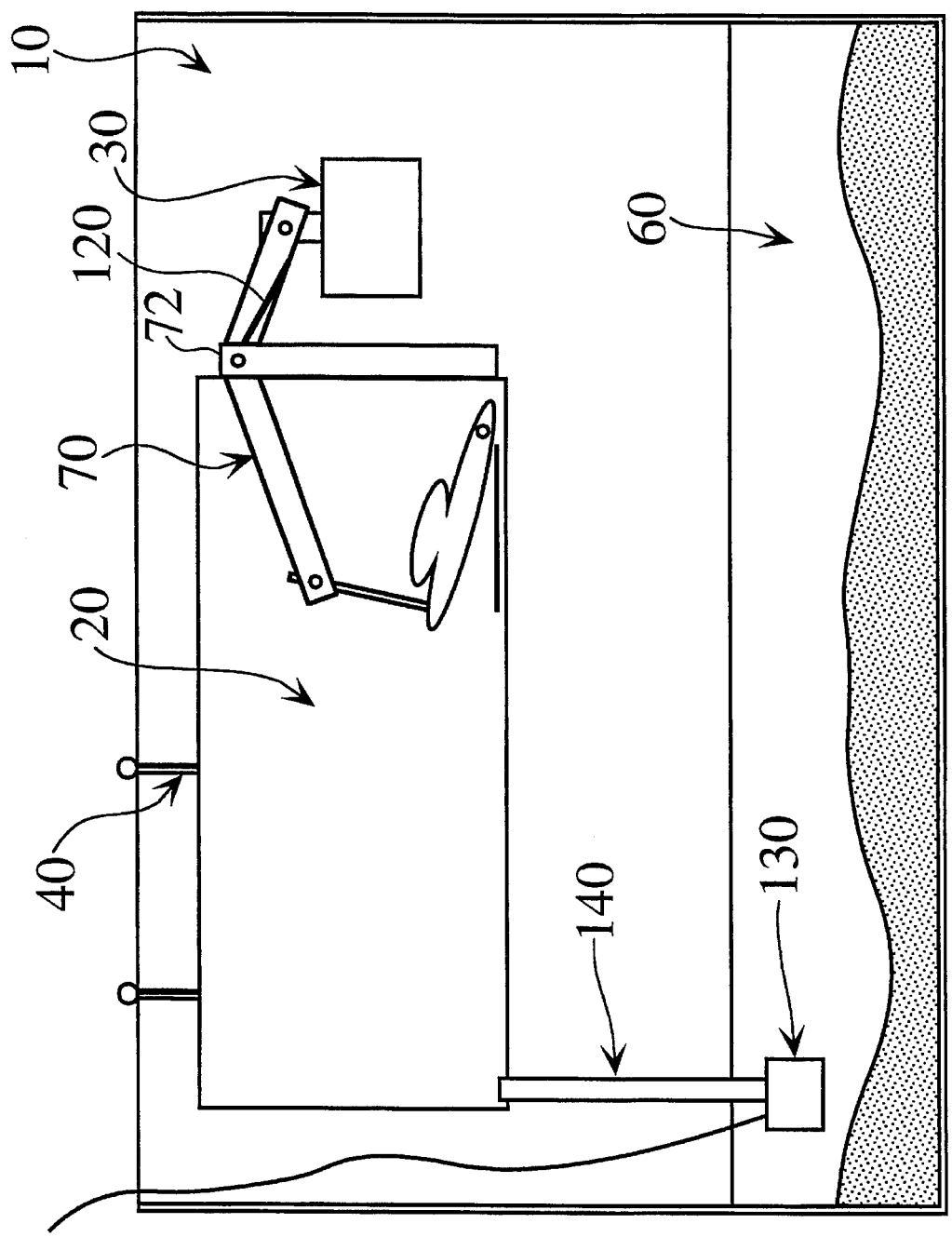
FIG. 1 is a front view illustrating a tide pool device inserted within an aquarium tank according to the invention.

FIG. 1 is a front view of a tide pool device inserted into an aquarium. As shown in the figure, the device includes a top container 20 that is inserted into an aquarium 10, and that is secured to the aquarium, for example by horizontal dowels 40 that are positioned transversely to the opening of the aquarium. In other embodiments of the invention, different methods of temporary attachment, such as suction cups, or permanent attachment, such as an adhesive, may be used. The tide pool device is preferably made of Plexiglas or glass to enhance its appearance, but may alternately be made of any other suitable material.

A pump 130 transfers water from the aquarium through a conduit 140 and into the top container, thereby lowering the water level 60 in the aquarium and simulating the effect of a retreating tide. The capacity of the pump, as well as the volumes of the various containers used in connection with the invention, is selected to provide a desired rate at which the water level is lowered in the aquarium.

An overflow container 30 is attached to the top container 20 to receive any water flowing from a filled top container. In the preferred embodiment of the invention, a lever 70 is pivotally connected 72 between the top container and the overflow container, and is a fixed to said overflow container, to permit the overflow container, as it is filled with water and thus increases in weight, to be lowered into the aquarium. One skilled in the art will appreciate that other means may be used to movably connect the two containers of the tide pool device.

Figure 2A:
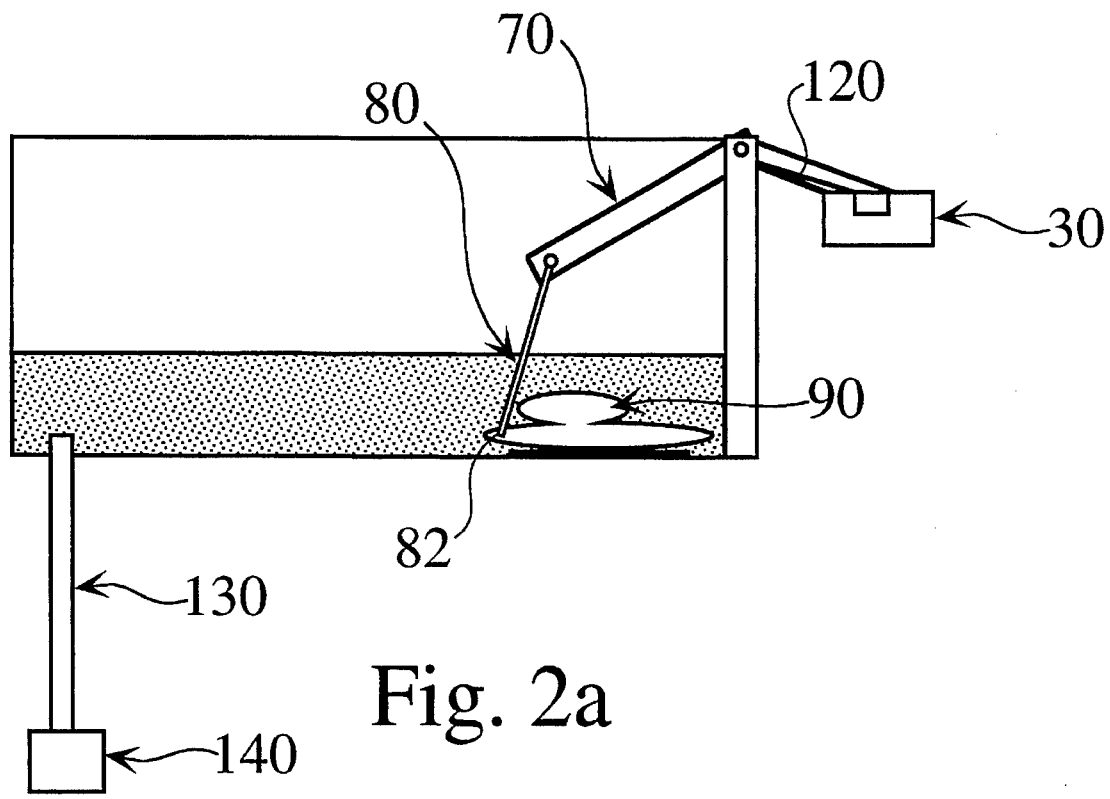
FIGS. 2a and 2b provide a front view of the tide pool device according to the invention when the device is being filled with water (FIG. 2a) and when the device is filled with water (FIG. 2b)
Figure 2B:
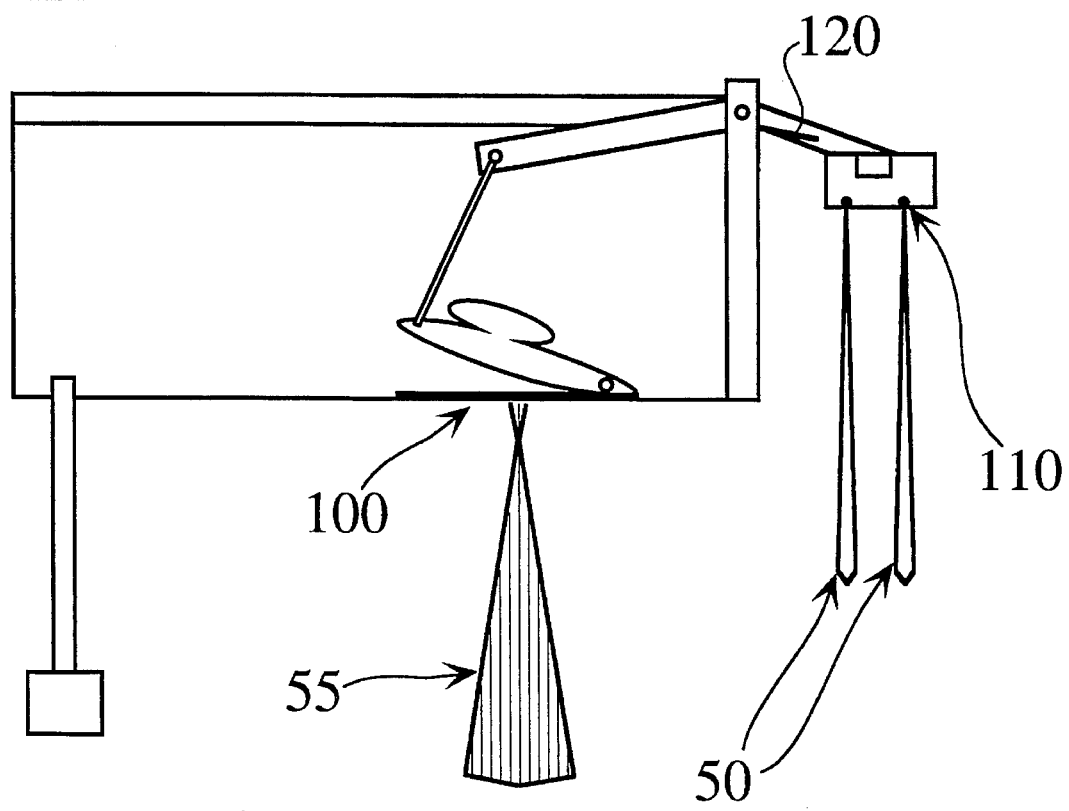

FIGS. 2a and 2b show front views of the tide pool device as the device is being filled with water (FIG. 2a) and when the device is filled with water (FIG. 2b). In the initial part of the tide cycle, water is pumped from the aquarium into the top container 20, lowering the water level in the aquarium and exposing its contents. While the aquarium uses fresh or sea water to support aquatic life forms contained therein, other fluids may be used in other instances, for example, in an educational diorama containing models of organisms.

A drain 100 in the top container is initially sealed by a flapper 90 that prevents the water from reentering the aquarium. In the exemplary embodiment of the invention, the flapper is connected to the lever 70 by a cable 80 that is pivotally connected to a pivot point 82 and responsive to movement of the lever.

Figure 3:
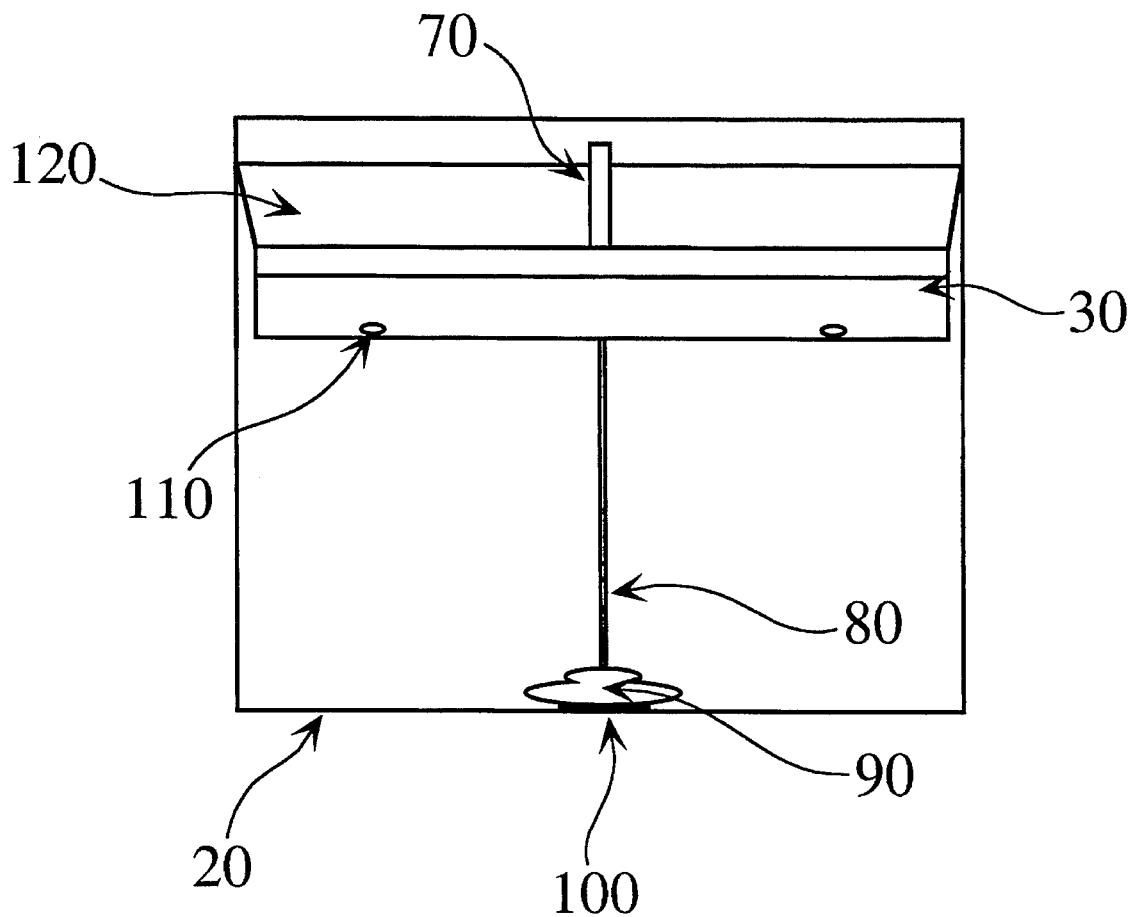
FIG. 3 is a side view of the tide pool device according to the invention.

When the top container is filled with water, the water flows into the overflow container 30. FIG. 3 is a side view of the tide pool device of the invention. The open channeling member 120 of the exemplary embodiment or, alternately, a tube directs water that is overflowing the top container into the overflow container. Drainage holes 110 in the overflow container allow some of the water 50 to flow back into the aquarium. As the overflow container fills with water, its increasing weight pulls down the lever, opening the drain in the top container. Water 55 that is pumped into the top container exits through the drain, permitting the overflow container to completely drain into the aquarium, and thereby raising the water level in the aquarium, which simulates the effect of an incoming tide. As the overflow container is emptied by the drainage holes 110, the flapper pulls down on the lever and the lever is raised, until the flapper is in position over the drain, closing the drain in the top container, and the cycle repeats.

The rate at which the water is returned to the aquarium by the drain is a function of the size of the drain and the volume of water that is accumulated in the top container. The accumulate/drain cycle has an interval that is determined by such factors as the rate at which water is pumped into the top container, the size of the top container, the length of the lever, and the rate at which water is permitted to drain from the overflow container. Additionally, the flapper may be weighted, or it may have a selected weight, such that the amount of force exerted by the lever on the flapper is selected to trip the flapper and empty the top container when a desired quantity of water is accumulated in the overflow container. Thus, less weight on the flapper allows the top container to empty when less water is accumulated in the overflow container, and vice versa. It will be appreciated that those skilled in the art will select from among these variable to provide a desired tide pool effect, e.g. an exaggerated effect having a short cycle time, or a realistic effect having a more natural cycle time.

The invention herein provides an aquarium having a realistic environment, for example by reproducing natural environmental rhythms, such as those of the tides; and provides an aquarium that is optimally displayed and integrated into the viewing environment. The invention therefore provides a unique mounting system for hanging an aquarium on a vertical surface, such as a wall in a secure fashion. In this way, the aquarium may be placed in a living room or den without the need of a stand that might take up otherwise precious floor space. Additionally, by positioning the aquarium on a wall, the specimens contained therein a displayed to advantage at a proper viewing height for observation.

Figure 4:
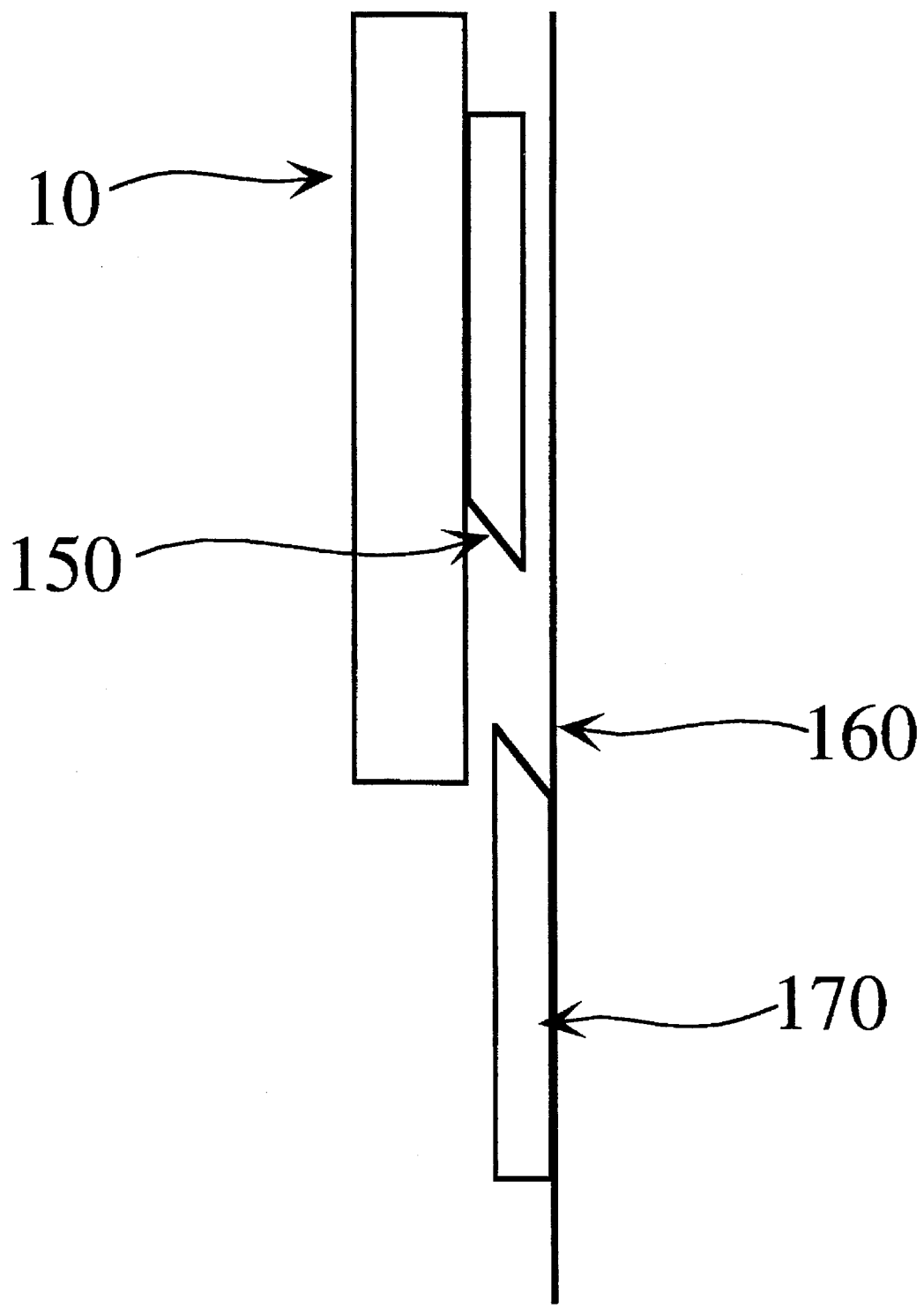
FIG. 4 is a side view detail of a wall-mounted aquarium according to the invention.

A side view of an embodiment of the invention that provides a wall-mounted aquarium is shown in FIG. 4. In the exemplary embodiment of the wall-mounted aquarium, a first interlocking member 150 is affixed to the aquarium 10 and second interlocking member 170 is mounted to a vertical surface, such as the wall 160.

The aquarium is placed to the wall and slid downwardly along the wall toward the second member, such that the two interlocking members are brought into abutting engagement with each other. The interlocking members may be constructed of a variety of materials, including wood, plastic, metal, or acrylics. The wall-mounted aquarium has a disproportionately small width in comparison to a standard free-standing tank to minimize the protrusion from the wall, and to prevent the tank from becoming too heavy to be supported as a wall mounted system. The width of the aquarium in the preferred embodiment of the invention is four inches, but other widths will work.

An opening at the top of the aquarium provides sufficient surface area for oxygenation of the water. Alternately, an aeration device may be used, and mounted with the tank. In the exemplary embodiment of the invention, the tide pool device is dimensioned to fit within the wall-mounted aquarium. Alternately, the tide pool device may be mounted on the side of the aquarium, or concealed within an opaque container. The wall mounted aquarium may also be used without the tide pool device. Lights may be used with the aquarium to enhance the aesthetic appeal of the wall-mounted aquarium, a changeable volume displacing backdrop may be inserted into the aquarium, and/or the aquarium may be surrounded by a decorative frame.

In the preferred embodiment of the invention, the backdrop is used in conjunction with the tide pool device to displace a selected volume of liquid in the aquarium. For example, a 50% displacement of water from the aquarium by a backdrop allows a seven-inch upper container to provide a simulated tide having a fourteen-inch rise and fall. The backdrop is preferably made if a vacuum formed portion that is contoured to appear as a rocky surface, such as is encountered in a tide pool. The vacuum formed portion includes a foam portion, such that the backdrop displaces water from the aquarium from the back of the aquarium almost to the front of the aquarium. The contours of the backdrop includes deep crevices that give an illusion of depth. The use of foam additionally saves weight, which is a critical factor when the tide pool device is used in a wall-mounted aquarium.

Figure 5:
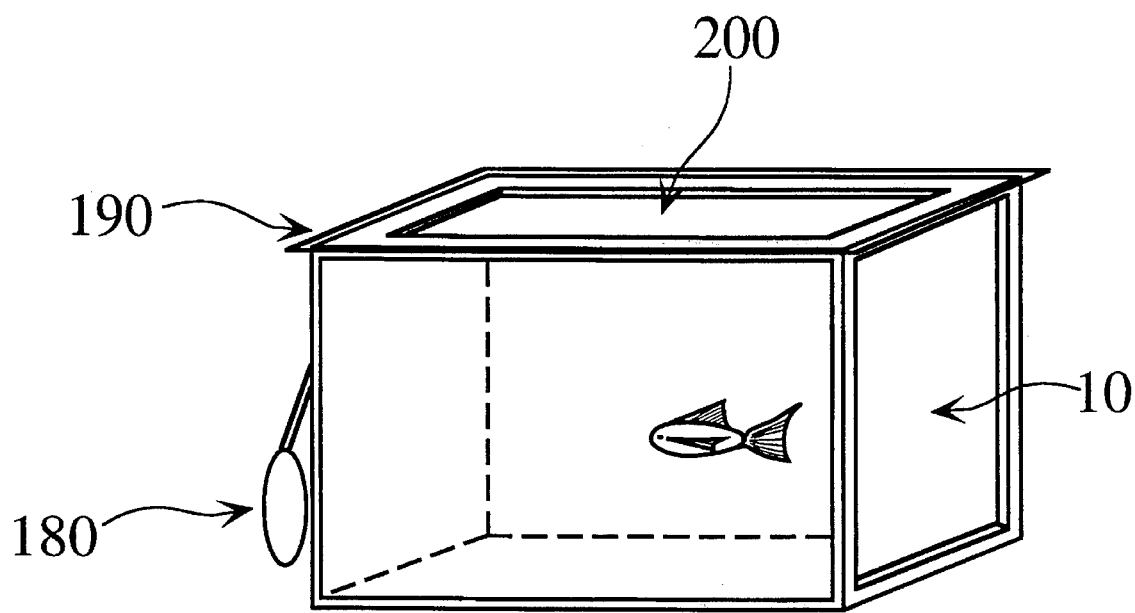
FIG. 5 is a perspective view of the coffee table aquarium according to the invention.

FIG. 5 is a perspective view of the coffee table aquarium according to the invention. The aquarium 10 is fitted into an opening in the top of a table frame, 190 with a transparent aquarium cover 200 positioned flush with the surface of the water contained therein. In a standard aquarium tank, the waterline changes because of water lost to evaporation. The present invention provides a superior view of the aquarium contents, as the top piece always rests on the water, and therefore always provides the clear view afforded by a glass-bottomed boat. In one embodiment of the invention, the cover includes floats (not shown)that have a lower specific gravity than water and that allow the cover to float upon and seek the water surface, even if the water level varies.

An aeration device 180 may be mounted to the coffee table. The tide pool device may be inserted into the top of this coffee-table aquarium, or mounted to the side of the table. In this embodiment, the tide pool device is inserted into the aquarium in the manner previously described with regard to FIG. 1. The coffee table aquarium may optionally be used without the tide pool device, and may include lights to enhance its appearance. The actual shape and style of the table itself is a matter of choice. It is expected that the aquarium may be constructed in any desired shape that allows the aquarium to be placed into the coffee table.

Although the invention is described herein with reference to the preferred embodiment, one skilled in the art will readily appreciate that other applications may be substituted for those set forth herein without departing from the spirit and scope of the present invention. For example, the means for controller tide effect parameters created by the tide pool device may be varied by changing the size of the aquarium tank, top and overflow containers. The throw of the lever, the speed of the pump, the weight of the flapper, and the size of the drain and drainage holes also vary the tide effects. Additionally, the tide pool device may be designed to provide variable times to fill and drain, or to be temporarily disabled, if so desired (for example by use of a timer on the pump). Accordingly, the invention should only be limited by the Claims included below.

I claim:

1. A tide pool device adapted for use with an aquarium, comprising:

a top container having side walls and a bottom wall, said top container being adapted to accumulate water;

a drain formed in the bottom wall of said top container;

a pump means for transferring water from said aquarium to said top container thereby lowering the water level in said aquarium tank;

an overflow container having side walls and a bottom wall, said overflow container being pivotally attached to said top container and adapted to receive any water that overflows from said top container;

a drainage hole formed in the bottom wall of said overflow container;

means for directing water that is overflowing from said top container into said overflow container;

a flapper covering said drain; and a coupling between said overflow container and said flapper that is adapted to lift said flapper from said drain when said overflow container is filled by a selected amount of water that flows into said overflow container from said top container.

2. The tide pool device of claim 1, wherein said coupling further comprises:

a lever that is responsive to changes in the weight of said overflow container as the overflow container fills with water or empties of water.

3. The tide pool device of claim 2, wherein said coupling further comprises:

a cable attached between said flapper and said lever for raising said flapper.

4. The tide pool device of claim 1, wherein said means for directing water further comprises:

an open channeling member.

5. The tide pool device of claim 1, wherein said tide pool device is adapted for insertion within a wall mounted aquarium.

6. The tide pool device of claim 1, wherein said tide pool device is adapted for external attachment to a wall mounted aquarium.

7. A floor mounted aquarium, including a tide pool device therein, wherein said tide pool device comprises:

a top container having side walls and a bottom wall, said top container being adapted to accumulate water;

a drain formed in the bottom wall of said top container;

a pump means for transferring water from said aquarium to said top container thereby lowering the water level in said aquarium;

an overflow container having side walls and a bottom wall, said overflow container being pivotally attached to said top container and adapted to receive any water that overflows from said top container;

a drainage hole formed in the bottom wall of said overflow container;

means for directing water that is overflowing from said top container into said overflow container;

a flapper covering said drain; and a coupling between said overflow container and said flapper that is adapted to lift said flapper from said drain when said overflow container is filled by a selected amount of water that flows into said overflow container from said top container.

8. A wall-mounted aquarium comprising a tide pool device, wherein said tide pool device comprises:

a top container having side walls and a bottom wall, said top container being adapted to accumulate water;

a drain formed in the bottom wall of said top container;

a pump for transferring water from said aquarium to said top container thereby lowering the water level in said aquarium tank;

an overflow container having side walls and a bottom wall, said overflow container being pivotally attached to said top container and adapted to receive any water that overflows from said top container;

a drainage hole formed in the bottom wall of said overflow container;

means for directing water that is overflowing from said top container into said overflow container;

a flapper covering said drain; and a coupling between said overflow container and said flapper that is adapted to lift said flapper from said drain when said overflow container is filled by a selected amount of water that flows into said overflow container from said top container.

9. A tide pool device adapted for use with an aquarium, comprising:

a top container having side walls and a bottom wall, said top container being adapted to accumulate water;

a drain formed in the bottom wall of said top container;

a pump means for transferring water from said aquarium to said top container thereby lowering the water level in said aquarium tank;

an overflow container having side walls and a bottom wall, said overflow container being pivotally attached to said top container and adapted to receive any water that overflows from said top container;

a drainage hole formed in the bottom wall of said overflow container;

an open channeling member means for directing water that is overflowing from said top container into said overflow container;

a flapper covering said drain; and a coupling between said overflow container and said flapper that is adapted to lift said flapper from said drain when said overflow container is filled by a selected amount of water that flows into said overflow container from said top container, wherein said coupling comprises a lever that is responsive to changes in the weight of said overflow container as the overflow container fills with water or empties of water and a cable attached between said flapper and said lever for raising said flapper.

10. The tide pool device of claim 9, wherein said tide pool device is adapted for insertion within a wall mounted aquarium.

11. The tide pool device of claim 9, wherein said tide pool device is adapted for external attachment to a wall mounted aquarium.

* * * * *